United States Patent [19]
Cufrini

[11] 3,793,736
[45] Feb. 26, 1974

[54] WHEEL ALIGNMENT MEASURING APPARATUS

[75] Inventor: Franco Cufrini, Frosinone, Italy

[73] Assignee: Allitalia Import-Export Inc., Buffalo, N.Y.

[22] Filed: July 21, 1972

[21] Appl. No.: 273,787

[52] U.S. Cl............................ 33/203.17, 33/203.15
[51] Int. Cl. ...................................... G01b 5/255
[58] Field of Search.........33/203, 203.12, 203.15, 33/203.17, 203.18, 203.2, 203.21

[56] References Cited
UNITED STATES PATENTS
| | | | |
|---|---|---|---|
| 2,061,326 | 11/1936 | Morse et al................. | 33/203.15 X |
| 1,840,766 | 1/1932 | Creagmile................... | 33/203.15 X |
| 2,378,631 | 6/1945 | Holmes....................... | 33/203.15 X |

FOREIGN PATENTS OR APPLICATIONS
| | | | |
|---|---|---|---|
| 864,005 | 7/1949 | Germany ......................... | 33/203.15 |
| 504,756 | 5/1939 | Great Britain ...................... | 33/203 |
| 62,650 | 7/1940 | Norway................................ | 33/203 |
| 970,298 | 9/1964 | Great Britain................... | 33/203.17 |

Primary Examiner—John W. Huckert
Assistant Examiner—Milton S. Gerstein
Attorney, Agent, or Firm—Christel & Bean

[57] ABSTRACT

A wheel alignment measuring apparatus for determining vehicle wheel camber and toe characteristics. A pair of telescopic measuring heads in the form of tubes are adjustable to the lateral spacing of a pair of vehicle wheels. Each tubular head is provided with an axial rod projecting through the head and carrying an elongated member having spaced probes engagable with diametrically opposed points on the rim of the wheel hub. The elongated member swings to an inclined position corresponding to the inclination of the wheel relative to a true reference plane causing movement of the rod, the rear end of which serves as a pointer associated with a calibrated scale to indicate the degree of wheel inclination.

7 Claims, 9 Drawing Figures

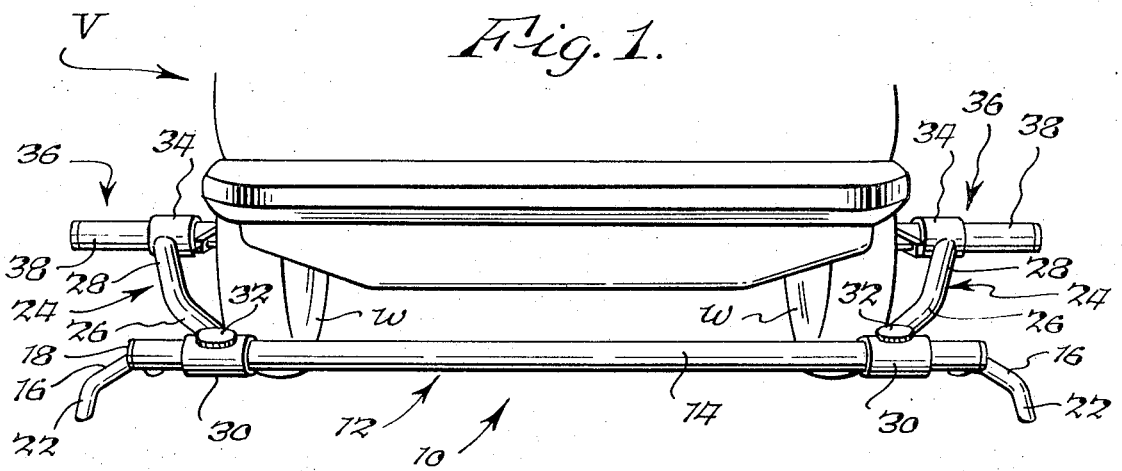
Fig. 1.
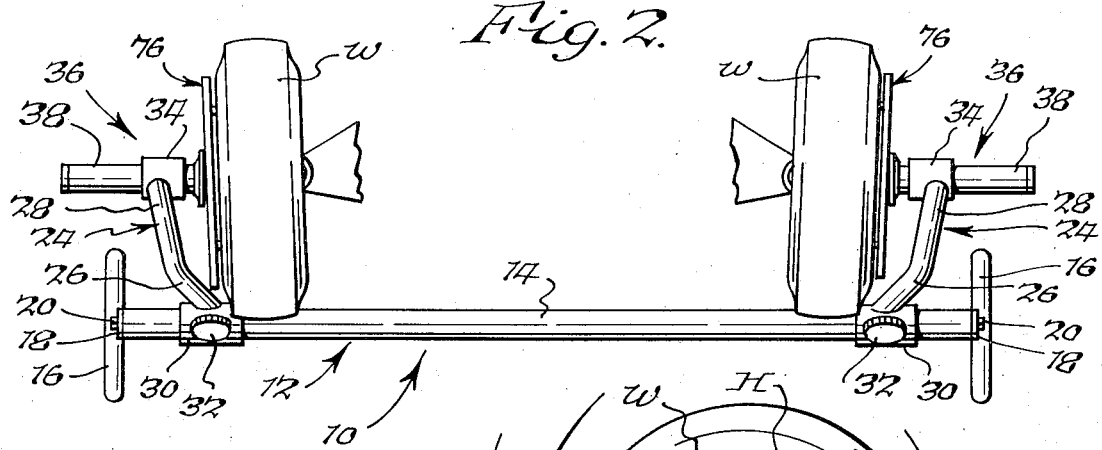
Fig. 2.
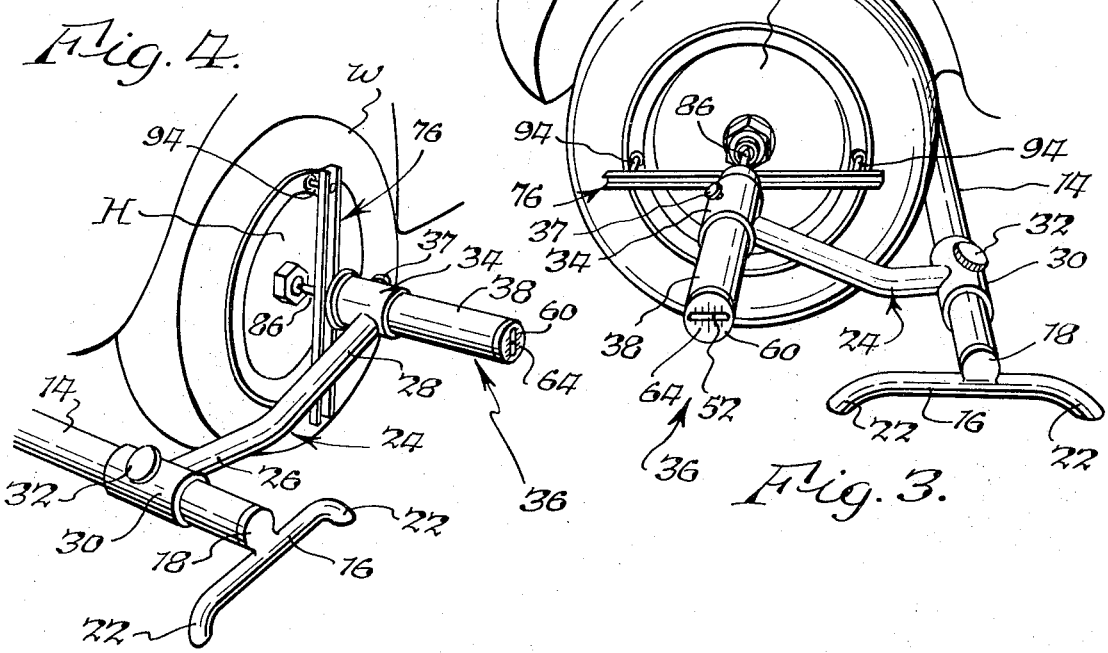
Fig. 4.
Fig. 3.

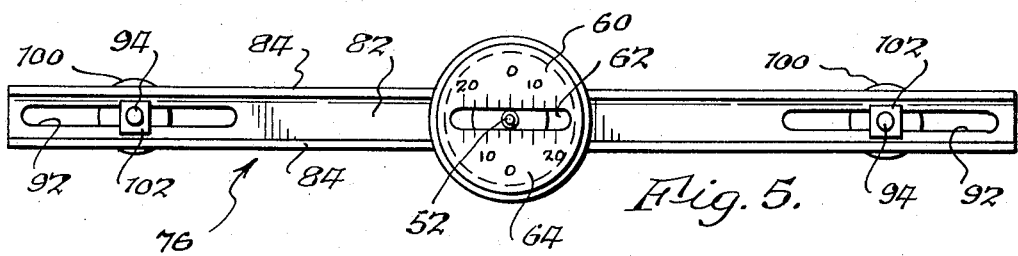
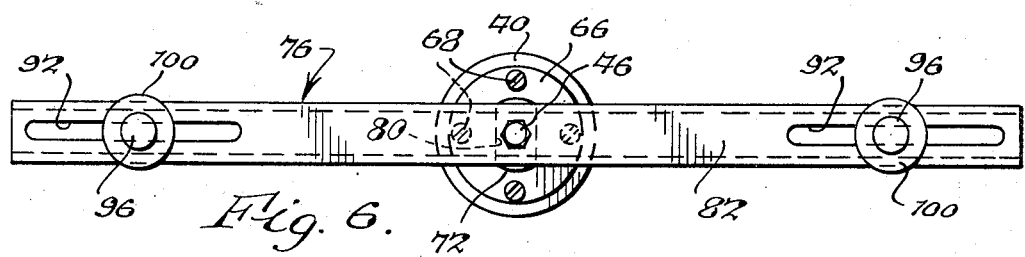
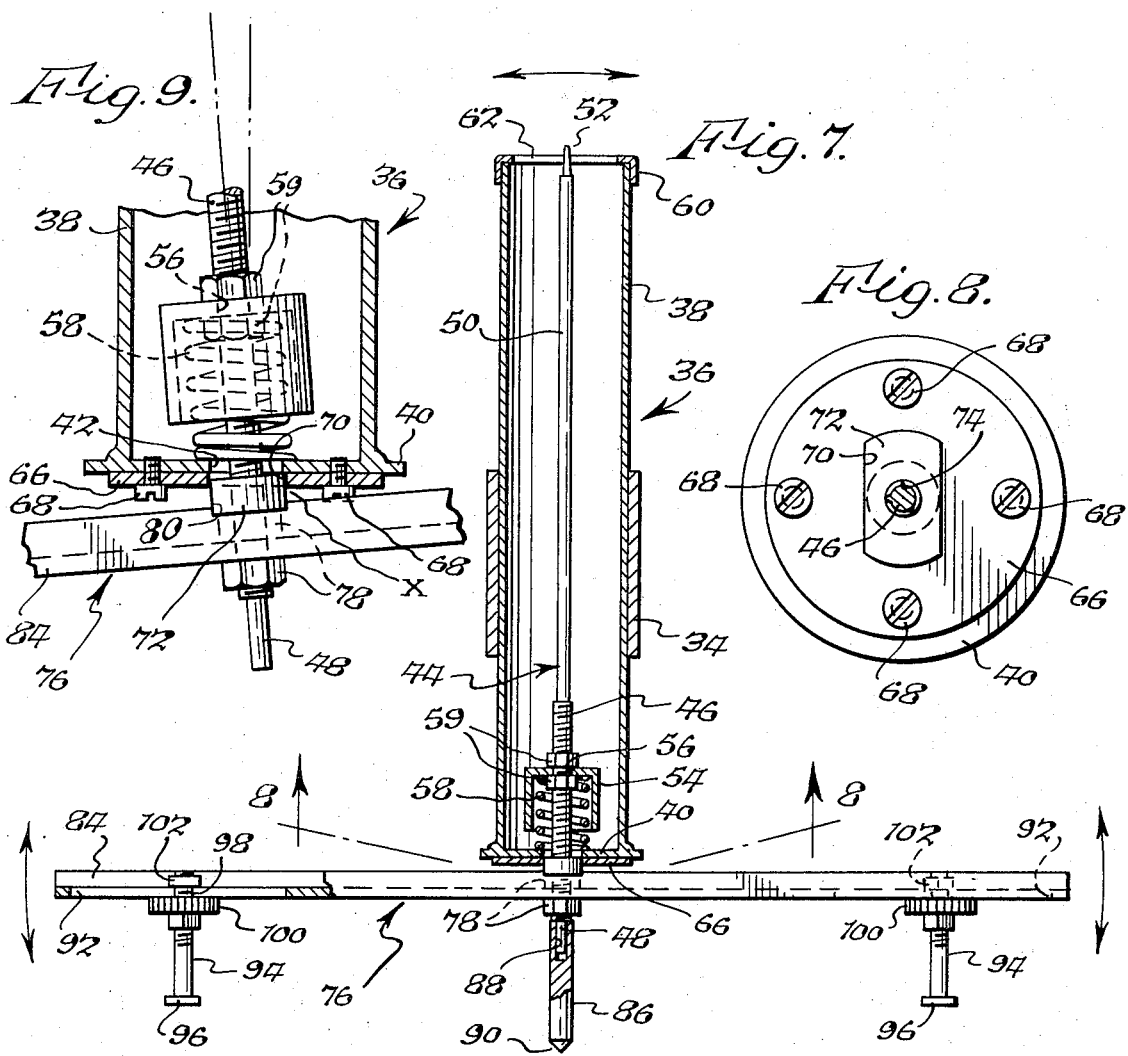

WHEEL ALIGNMENT MEASURING APPARATUS

BACKGROUND OF THE INVENTION

This invention relates to a measuring apparatus and, more particularly, to a measuring apparatus for determining the true alignment of vehicle wheels.

Numerous devices have been developed for the purpose of measuring vehicle wheel alignment. Many of these devices are extremely complicated, incorporating electronic detectors and sophisticated equipment, requiring a large amount of space and the services of an appropriately trained and skilled technician. Generally, these elaborate measuring apparatus are not practical for use in the smaller garages or service stations. Other mechanical measuring devices are known, which are complex and cumbersome in construction, difficult and time consuming to set up, and which are generally adapted for one type of measuring only, such as the toe characteristics of the vehicle wheels for example.

SUMMARY OF THE INVENTION

Accordingly, it is a primary object of the present invention to provide a novel and simple wheel alignment measuring apparatus for determining both vehicle wheel toe and camber characteristics with great accuracy and which can be readily used by untrained personnel possessing relatively little skill.

Another object of this invention is to provide a wheel measuring device which is simple and strong in construction, relatively low in costs rendering it practical for small garages and service stations, rugged and durable in use, and highly accurate in operation.

The wheel alignment measuring apparatus of this invention is characterized by the provision of a pair of telescopic measuring heads in the form of tubes adjustable to the lateral spacing of a pair of vehicle wheels, the tubular heads being provided with means centering the heads relative to the wheel hub axes. A transversely extending, elongated member is mounted on the projecting end of a rod passing through each tubular head and is provided with spaced probes, radially equidistant from the hub axis and engagable with diametrically opposed points on the rim of each wheel hub. Tilting movement of the elongated member, due to the inclination of a wheel, is transmitted to the rod, which has a pointer at the rear end thereof operatively associated with a scale for indicating the degree of camber and the toe characteristics of the wheel.

The foregoing and other objects, advantages and characterizing features of the present invention will become clearly apparent from the ensuing detailed description of an illustrative embodiment thereof, taken together with the accompanying drawings wherein like reference numerals denote like parts throughout the various views.

BRIEF DESCRIPTION OF THE DRAWINGS

FIG. 1 is a front elevational view of the wheel alignment measuring apparatus of this invention, shown in operative position relative to the front wheels of a vehicle;

FIG. 2 is a plan view thereof;

FIG. 3 is a side perspective view of one of the measuring tubular heads of this invention;

FIG. 4 is a fragmentary perspective view, illustrating the mode of centering the measuring apparatus of this invention relative to a wheel to be measured;

FIG. 5 is a rear end view of the measuring head and certain sensing elements incorporated in the measuring apparatus of this invention;

FIG. 6 is a front end view of the apparatus of FIG. 5;

FIG. 7 is a plan view, partly in section, of the apparatus of FIG. 5;

FIG. 8 is a sectional view, on an enlarged scale, taken about on line 8—8 of FIG. 7, and showing the front face of the measuring head of this invention; and FIG. 9 is a fragmentary, longitudinal sectional view, on an enlarged scale, of the front portion of the measuring head of FIG. 7.

DETAILED DESCRIPTION OF AN ILLUSTRATIVE EMBODIMENT

Referring now in detail to the illustrative embodiment depicted in the accompanying drawings, there is shown in FIG. 1 a wheel alignment measuring apparatus, generally designated 10 and constructed in accordance with this invention, shown positioned adjacent the front end of a vehicle V for measuring the camber and toe characteristics of the wheels W thereof. Apparatus 10 comprises a frame 12 having an elongated tubular member 14 adapted to extend transversely of the vehicle V. A pair of crossbars 16 are releasably secured to the opposite ends of member 14, each cross bar 16 being provided with a generally circular extension 18 secured to the end of member 14 by a suitable fastener 20. Each crossbar 16 is provided with downwardly curved end portions 22 serving as supports adapted to rest on the floor or any other suitable supporting surface.

A pair of angularly bent arms 24 are mounted on tubular member 14 for sliding movement relative thereto. Each arm 24 consists of a pair of angularly related tubular portions 26 and 28, the former terminating in a sleeve or collar 30 slidably mounted on tubular member 14. A set screw 32 is mounted in collar 30 for securing the same in a selected position on tubular member 14. A sleeve 34 is welded or otherwise fixedly secured to the end of tubular portion 28 for receiving a tubular measuring head 36 therethrough. A set screw 37 is mounted in sleeve 34 for securing head 36 in the selected position relative to sleeve 34. Since arms 24 and heads 36 employed at the opposite ends of tubular member 14 are identical in construction, it is believed that a detailed description of only one will suffice, it being understood that the same reference characters identify similar parts.

As shown in FIG. 7, head 36 comprises an elongated cylindrical body or shell 38 having a front end wall 40 welded or otherwise fixedly secured to shell 38. A central opening 42 is provided in front end wall 40 for receiving a rod 44 therethrough, the opening 42 being somewhat larger than rod 44 to permit lateral play thereof. Rod 44 has a threaded portion 46 extending through opening 42 and terminating in a projecting stud 48 of reduced diameter and a major reduced diameter portion 50 terminating in a pointer 52.

The rear end of shell 38 is closed by a cap 60 having a slot 62 therein for receiving the distal end of pointer 52. A calibrated scale 64, comprising a series of markings imprinted or impressed on the outer surface of cap 60 on opposite sides of slot 62, indicates measurements in millimeters, or degrees, as desired.

A circular plate 66 is secured to the outer face of front end wall 40 by screw fasteners 68 extending through suitable openings in plate 66 and threaded into tapped openings provided in front end wall 40. A generally rectangularly shaped central opening 70 having rounded ends is provided in circular plate 66 for partially receiving a key 72 having a complementary-shaped outline therein. Key 72 has a central opening 74 for receiving the forward end of rod 44 therethrough with a snug fit.

Also mounted on the forward end of rod 44 is an elongated channel member 76 extending in a direction normal to rod 44. Channel member 76 is provided with a central opening receiving rod 44 and clamped on the forward end of rod threaded portion 46 between a pair of nuts 78. The axial outer end of key 72 is fitted within a shallow groove 80 formed in channel member 76. As shown in FIGS. 7 and 8, key 72 serves to orient channel member 76 in the proper direction, parallel to slot 62, and also serves to space channel member 76 forwardly of plate 66. Channel member 76 is provided with a web 82 and a pair of inturned flanges 84 (FIG. 5) extending from the opposite sides of web 82 in a direction normal thereto and towards head 36.

Stud end 48 of rod 44 projects axially beyond channel member 76 and supports a centering pin 86 having an axial recess 88 for engagement with stud end 48 of rod 44. The other end of centering pin 86 terminates in a point 90 adapted to engage the axis of a wheel hub H for centering measuring head 36 relative to the wheel to be measured.

As shown in FIGS. 5, 6, and 7, web 82 is provided with longitudinally spaced, elongated slots 92 for adjustably receiving a pair of sensors or probes 94. One end of each probe 94 is provided with a flat head 96 engagable with the rim of the wheel hub H, the other end of probe 94 being threaded as shown at 98 in FIG. 7. A disc-like knob 100 is fixedly secured to probe 94 for facilitating rotation thereof in order to effect certain adjustments, hereinafter described. A flat-sided nut 102, disposed within the channel formed by flanges 84, is threaded onto the distal end of probe 94 for securing the latter in a selected position along slot 92 in channel member 76.

Prior to the utilization of the measuring apparatus 10 of this invention, the tires should be checked for proper inflation and the efficiency of the vehicle's shock absorbers should be checked. Also, any play in the rear wheel axle holders and the steering mechanisms should be registered and the rim of each wheel hub should be perfectly round or concentric. After these checks are made, the operator can then advance the vehicle toward the alignment measuring apparatus 10 which is positioned on a level surface, with wheels W oriented straight ahead, the vehicle being halted by the hand brake.

Referring now to FIGS. 1-4 of the drawings, apparatus 10 is adjusted in a preliminary way with arms 26 moved relative to tubular member 14 to accommodate the spacing between wheels W. Arms 24 are inclined upwardly to bring heads 36 to approximately the level of and near the axes of the front wheels W. At each side of the vehicle, the centering pin 86 is mounted on the projecting stud 48 of rod 44 and aligned with the axis of wheel hub H. Set screws 32 and 37 are then tightened to secure arm 24 and measuring head 36 in the proper aligned orientation. The knobs 100 adjacent the opposite ends of each channel member 76 are loosened in order to position probes 94 at a spaced-apart distance corresponding to the diameter of the rim of hub H and equidistant from centering pin 86. Probes 94 are then fixed at these selected positions by rotating knobs 100 to tightly secure the threaded portions 98 of probes 94 in nuts 102 with knobs 100 bearing against the outer surfaces of channel member 76. It should be noted that this adjustment can be effected by hand without the use of any tools since the flat-sided nuts 102 are fixed against rotation by flanges 84 of member 76. The effective lengths of the two probes 94 measured from web 82 of channel member 76 are equal.

After probes 94 are properly fixed at the correct spacing from each other, set screw 37 is loosened and head 36 is pulled away from the wheel W and centering pin 86 is removed. In order to determine the camber of the wheel, i.e., the vertical inclination thereof relative to a true vertical plane, head 36 is rotated within sleeve 34 to position measuring channel 76 in a vertically extending position. Head 36 is then slid toward the vehicle wheel W until the heads 96 of probes 94 engage the rim of the wheel hub H at diametrically opposed, vertically aligned points. It should be understood that the orientation of the wheels are designed or intended to be normally inclined slightly relative to a true vertical reference plane whereby the tops of the wheels W are disposed outwardly of such reference plane and the bottoms of wheel W are disposed inwardly of such plane. Thus, when head 36 is moved inwardly toward the wheel hub H, the top probe 94 will normally engage the hub rim before the bottom probe 94, causing channel member 76 to tilt or swing in a vertical plane about a pivot defined by the side of key 72 and the side wall edge defining opening 70 in plate 66 as shown at X in FIG. 9. Should channel member 76 swing in the opposite direction, the opposite side of key 72 and the opposite side wall defining opening 70 would serve as a pivot. When both probes 94 contact the hub rim, channel member 76 will be disposed in an inclined plane corresponding to the inclination of the wheel W relative to a true vertical plane. Rod 44 is tilted along with channel member 76 against the bias of spring 58 and relative to the axis of head 36 causing pointer 52 to move longitudinally in slot 62 to indicate the extent of camber or vertical inclination of the measured wheel W relative to a true vertical plane.

Scale 64 (FIG. 5) can be calibrated in millimeters indicating the deviation from a base at zero, or in degrees to determine the angle of vertical inclination relative to a true vertical plane, as desired. In any event, the movement of rod pointer 52 corresponds to the extent of swinging movement of channel member 76 to determine the camber of wheels W. This reading can be compared to the desired camber of the wheels, including tolerances, set forth in the reference manual for the specific vehicle being checked to determine whether any adjustments are necessary for proper wheel alignment.

In a similar manner, the toe characteristics, namely toe-in (convergence) or toe-out (divergence) of the vehicle wheels W can be measured. By way of example, toe-in for a pair of laterally spaced wheels means that the distance between the wheel planes of rotation at points on the horizontal diameters behind the wheel axes is greater than the distance between the planes at points on the same diameters in front of the wheel axes. In order to determine the toe characteristics of the wheels W, channel member 76 is oriented in a horizontal direction parallel to the floor surface prior to advancing probes 94 against the rims of the wheel hub H. Of course, slot 92 will also be oriented in a horizontal direction and rod pointer 52 will swing in a lateral direction along with channel member 76 a distance commensurate with the extent of convergence or divergence of wheels W relative to a vertical plane, or reference plane, cut through the longitudinal axis of the vehicle. The rear wheels are measured in the same manner as the front wheels, as described above, except that tubular member 14 will be located rearwardly of the vehicle behind the rear wheels.

From the foregoing, it is apparent that the objects of this invention have been fully accomplished. As a result of this invention, an improved wheel alignment measuring apparatus is provided for determining both vehicle wheel camber and toe characteristics with optimum precision. While the measuring apparatus of this invention is relatively simple in construction, it is durable in use and can be used by persons possessing relatively little skill. Moreover, the relatively low cost thereof renders it practical for use in small garages and service stations.

One form of this invention having been disclosed in detail, it is to be understood that this has been done by way of illustration only.

I claim:

1. A wheel alignment measuring apparatus comprising: a frame; at least one wheel alignment measuring head; means supporting said head on said frame for movement relative to said frame towards and away from a vehicle wheel hub; an elongated member extending in a direction generally normal to the axis of said head; means mounting said elongated member on said head for pivotal movement relative thereto; means on said elongated member engagable with diametrically opposed portions of the rim of said hub for effecting swinging movement of said elongated member into an inclined position corresponding to the inclination of said wheel relative to a reference plane; said measuring head comprising a tubular body having a front end wall provided with an opening and a rear end cap having a slot therein; said end cap having a calibrated scale formed on the outer face thereof adjacent said slot; an elongated rod extending axially through said body; means biasing said rod centrally of said body along the longitudinal axis thereof; said rod having one end projecting axially through said opening and rigidly secured to said elongated member; the other end of said rod forming a pointer movable in said slot.

2. A wheel alignment measuring apparatus according to claim 1 wherein said frame includes an elongated tubular member supported at its opposite ends on a pair of floor engaging crossbars.

3. A wheel alignment measuring apparatus according to claim 2 wherein said supporting means comprises an arm mounted at one end thereof on said tubular member for sliding movement relative thereto; the other end of said arm having a sleeve for slidably receiving said head therein.

4. A wheel alignment measuring apparatus according to claim 1 wherein said rim engagable means comprises a pair of longitudinally spaced probes of equal effective lengths mounted on said elongated member and extending in a direction normal thereto; and means adjustably spacing said probes apart a distance corresponding to the diameter of the rim of the wheel to be measured.

5. A wheel alignment measuring apparatus according to claim 1 including means removably mounted on said one end of said rod for centering said head relative to the axis of said wheel hub.

6. A wheel alignment measuring apparatus according to claim 5 wherein said rim engagable means comprise a pair of longitudinally spaced probes mounted on said elongated member and extending in a direction normal thereto; and means adjustably spacing said probes apart a distance corresponding to the diameter of the rim of the wheel to be measured.

7. A wheel alignment measuring apparatus comprising a pair of wheel alignment measuring heads according to claim 1 slidably mounted on said frame for adjustment toward and away from each other corresponding to the lateral spacing of a pair of vehicle wheels.

A cup-shaped member 54 (FIGS. 7 and 9) having an opening 56 in the end wall thereof is mounted on portion 46 of rod 44 for receiving one end of a helical compression spring 58 disposed about the forward end of rod 44 and captively held in tubular head 36 between the end wall of cup-shaped member 54 and the inner face of front end wall 40. Member 54 is secured in place on the threaded portion 46 of rod 44 by a pair of lock nuts 59 bearing against the inner and outer faces of the cup member end wall. Spring 58 biases rod 44 centrally of head 36 to a position extending horizontally along the axis of head 36.

* * * * *

UNITED STATES PATENT OFFICE
CERTIFICATE OF CORRECTION

Patent No. 3,793,736     Dated February 26, 1974

Inventor(s) Franco Cufrini

It is certified that error appears in the above-identified patent and that said Letters Patent are hereby corrected as shown below:

Column 6, lines 39-50 should instead appear in column 2 between lines 64 and 65.

Signed and sealed this 15th day of October 1974.

(SEAL)
Attest:

McCOY M. GIBSON JR.
Attesting Officer

C. MARSHALL DANN
Commissioner of Patents